United States Patent [19]

Kurita et al.

[11] 3,988,242
[45] Oct. 26, 1976

[54] EXPRESSING FILTER PLATE FOR FILTER PRESS OF EXPRESSION TYPE

[75] Inventors: Tetsuya Kurita, Takarazuka; Atsushi Kataoka, Toyonaka, both of Japan

[73] Assignee: Kurita Machinery Manufacturing Company, Osaka, Japan

[22] Filed: Apr. 27, 1976

[21] Appl. No.: 680,806

[52] U.S. Cl. .............................................. 210/227
[51] Int. Cl.² ............................................ B01D 25/12
[58] Field of Search ............. 100/198; 210/227–231, 210/346, 347, 486

[56] References Cited
UNITED STATES PATENTS

| | | | |
|---|---|---|---|
| 3,017,996 | 1/1962 | Riley | 210/346 |
| 3,289,845 | 12/1966 | Weber | 210/231 |
| 3,347,383 | 10/1967 | Augerot | 210/231 X |
| 3,737,041 | 6/1973 | Kitajima et al. | 210/228 |
| 3,836,002 | 9/1974 | Radford | 210/486 X |
| 3,926,811 | 12/1975 | Ramsteck | 210/227 X |
| 3,931,014 | 1/1976 | Heimbach | 210/231 |

Primary Examiner—Charles N. Hart
Assistant Examiner—Richard W. Burks
Attorney, Agent, or Firm—Holman & Stern

[57] ABSTRACT

An expressing filter plate comprising a base plate and a diaphragm sheet covering the base plate and having a filter surface, with a pressure fluid chamber formed between the base plate and the diaphragm sheet. The diaphragm sheet is formed, in its peripheral portion to be clamped between pressed filter plates, with a fluid passing opening in communication with a fluid passage in the base plate. A covering member having a tubular portion fitting in the opening is made of a material having higher hardness than the diaphragm sheet. The covering member has a flange portion formed with fluid grooves for maintaining the tubular portion in communication with filtrate grooves in the filter surface of the diaphragm sheet.

8 Claims, 7 Drawing Figures

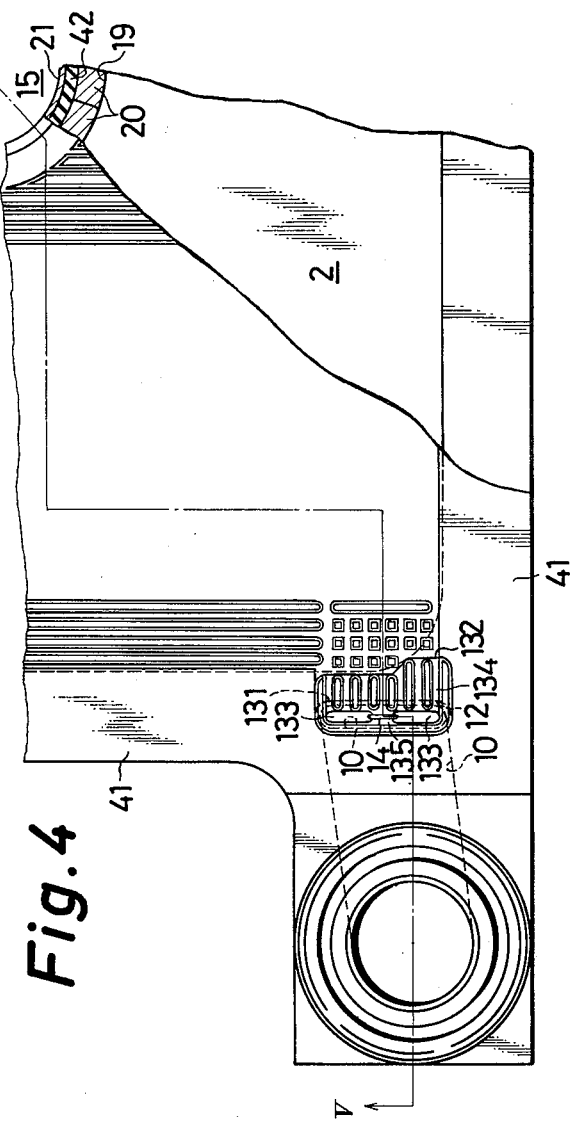

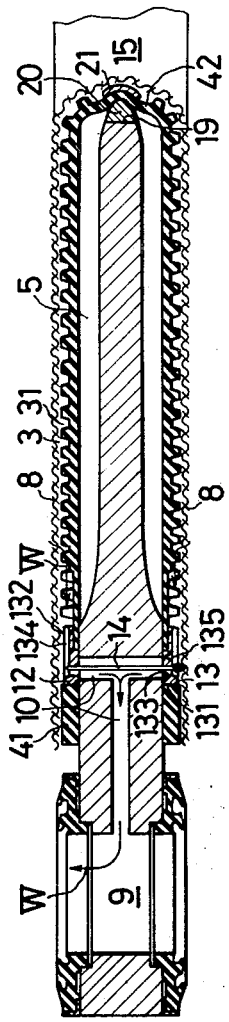
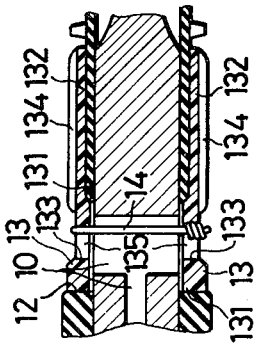
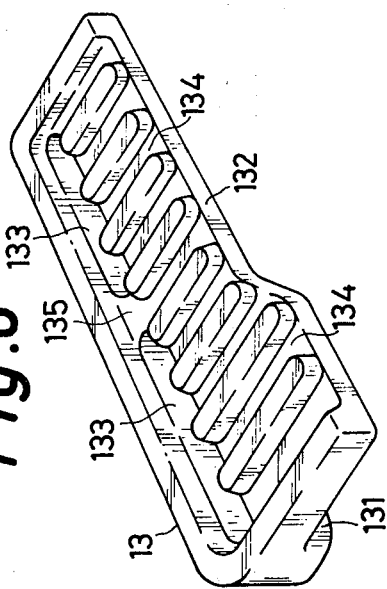

EXPRESSING FILTER PLATE FOR FILTER PRESS OF EXPRESSION TYPE

BACKGROUND OF THE INVENTION

The present invention relates to an expressing filter plate for filter presses of the expression type.

Various types of expression filter presses are known which include one type comprising base plates and diaphragm sheets each covering the base plate and having a filter surface formed with filtrate grooves. The grooved filter surface of the diaphragm sheet defines at least one side of a filter chamber to which a prefilt is fed under pressure. The prefilt is filtered by a filter medium covering the diaphragm sheet. Subsequently a pressure fluid is supplied to a fluid chamber formed between the diaphragm sheet and the base plate, bulging the diaphragm sheet toward the filter chamber to press the cake remaining in the filter chamber. The filtrate filtered off by the filter medium flows down the filtrate grooves in the filter surface. Since a filtrate passage for drawing off the filtrate is formed in the base plate, the diaphragm plate is provided in its filter surface with a filtrate outlet communicating with the filtrate passage in the base plate.

FIG. 1 shows an expressing filter plate of the type described which comprises the combination of a diaphragm sheet A and a base plate C so as to effect both filtration and expression. With the illustrated construction, the diaphragm sheet A has a filtrate outlet B which is merely so formed as to communicate with a filtrate passage D formed in the base plate C. Expressing filter plates E are arranged alternately with ordinary filter plates G having filter surfaces F, or the same expressing filter plates are arranged side by side although unillustrated, with filter chambers H provided between adjacent plates for the filtration of prefilt and expression of cake. When expressing the cake, a pressure fluid is fed to a fluid chamber I between the diaphragm sheet A and the base plate C to establish a pressure balance between the chamber I and the filter chamber H. Consequently the diaphragm sheet A is usually subjected to pressure for example of about 4 to 10 kg/cm² from both the chambers H and I on its opposite sides, with the result that the sheet tends to decrease in thickness and to spread out in a plane, undergoing plastic deformation. This deformation is directed concentrically to the filtrate outlet portion B where no resistance is encountered. The repetition of filtration and expression leads to increased deformation with the lapse of time, consequently blocking the filtrate outlet B. The filtrate outlet B is provided outside the bulging area of the diaphragm sheet A, namely in the portion of the sheet A which is clamped between the base plate C and the filter plate G or between the base plates, whereby the filtrate outlet portion B is held immediately adjacent to the filtrate passage D of the base plate. This construction readily ensures reliable communication between the filtrate outlet B and the filtrate passage D. However since the expressing filter plate E and filter plate G, or the closely fitted filter plates are tightly held together during expressing operation without any separation, these plates are pressed against each other with pressure greater than the expressing pressure. This produces greater deformation in the filtrate outlet portion B of the diaphragm A, promoting the blocking of the outlet B.

When the filtrate outlet B has been constricted or blocked up, the filtrate flowing down the grooves K in the filter surface J of the diaphragm sheet A is greatly hindered or prevented from flowing into the filtrate passage D of the base plate C by way of the outlet B. Discharge of the filtrate is impeded or prevented. As a result, abnormal high pressure will build up in the filter chamber H and pressure fluid chamber I and further in the prefilt feed passage, entailing the hazard of damage to the apparatus.

A wash liquor inlet, like the filtrate outlet, is further formed in the diaphragm sheet in communication with a wash liquor passage in the base plate for the reverse washing of the filter medium to remove the cake. With the known construction, the wash liquor inlet similarly tends to be constricted or blocked, in which event reverse washing can not be performed sufficiently or may be prevented, with abnormal high pressure created to damage the wash liquor feeding system.

SUMMARY OF THE INVENTION

An object of this invention is to provide a fluid inlet or outlet opening which is serviceable, free of any constriction or blocking, as the above-mentioned filtrate outlet or wash liquor inlet to thereby ensure smooth discharge or filtrate or smooth inflow of wash liquor without entailing abnormal high pressure.

Another object of this invention is to provide the opening with a very simple construction.

Still another object of this invention is to provide fluid grooves in the vicinity of the fluid inlet or outlet opening which grooves are serviceable free of any deformation to permit outflow of filtrate or inflow of wash liquor without any interference and to thereby ensure satisfactory filtration and expression or washing.

The present invention provides an expressing filter plate comprising a base plate, a diaphragm sheet having a filter surface and covering the base plate, the diaphragm sheet being formed with at least one fluid passing opening in communication with a fluid passage serving as a filtrate passage formed in a lower portion of the base plate or as a wash liquor passage formed in an upper portion of the base plate, and a covering member made of a material having higher hardness than the diaphragm sheet and including a tubular portion fitting in the fluid passing opening. The tubular portion serves as a fluid inlet or outlet opening of the diaphragm. Since it is of higher hardness than the sheet, the inner periphery of the tube defining the inlet or outlet opening satisfactorily retains its shape without expanding inward toward the center of the opening when the sheet is subjected to pressure on its opposite surfaces. Thus the fluid inlet and outlet opening will not be constricted or blocked due to plastic deformation or will not be so deformed even elastically, namely temporarily. Consequently the tubular portion always assures smooth outflow of filtrate or smooth inflow of wash liquor, free of abnormal high pressure and the possible damage to the apparatus.

The tubular portion is integral with a flange portion for covering the portion of the diaphragm sheet in the vicinity of the fluid passing opening, especially the portion adjacent the opening over which the filtrate flows into the opening or the wash liquor is fed to the filter surface. The flange portion effectively prevents the diaphragm sheet from constricting or blocking the opening by being forced over the edge of the tubular portion. The flange portion is formed in its surface with fluid grooves for maintaining the tubular portion in communication with the filtrate grooves in the filter surface of the diaphragm sheet. The fluid grooves are provided for the diaphragm sheet at the portion thereof which is clamped between the filter plates so as to withstand the clamping pressure. Accordingly the fluid grooves assure stable outflow of the filtrate or stable inflow of the wash liquor, permitting filtration and expression or reverse washing at constant pressure.

The covering member may be elastically fitted to the fluid passing opening of the diaphragm sheet or may be secured by screw or otherwise joined to the opening portion. Alternatively, the covering members fitted to the diaphragm sheets on the opposite surfaces of the base plate may be fastened together by a wire or string to secure the members to the sheets.

Other features of this invention will become more apparent from the following description of an embodiment given with reference to the accompanyig drawings.

BRIEF DESCRIPTION OF THE DRAWINGS

FIG. 4 is a fragmentary front view on an enlarged scale showing the filtrate outlet portion of FIG. 3;

FIG. 5 is a fragmentary enlarged view in section taken along the line V—V in FIG. 3;

FIG. 6 is a persepctive view of a covering member fitted to the filtrate outlet of a diaphragm sheet; and FIG. 7 is an enlarged view in section showing the covering members mounted in position.

DESCRIPTION OF THE PREFERRED EMBODIMENT

An embodiment of this invention will be described below with reference to FIGS. 2 to 7.

Figure 1:
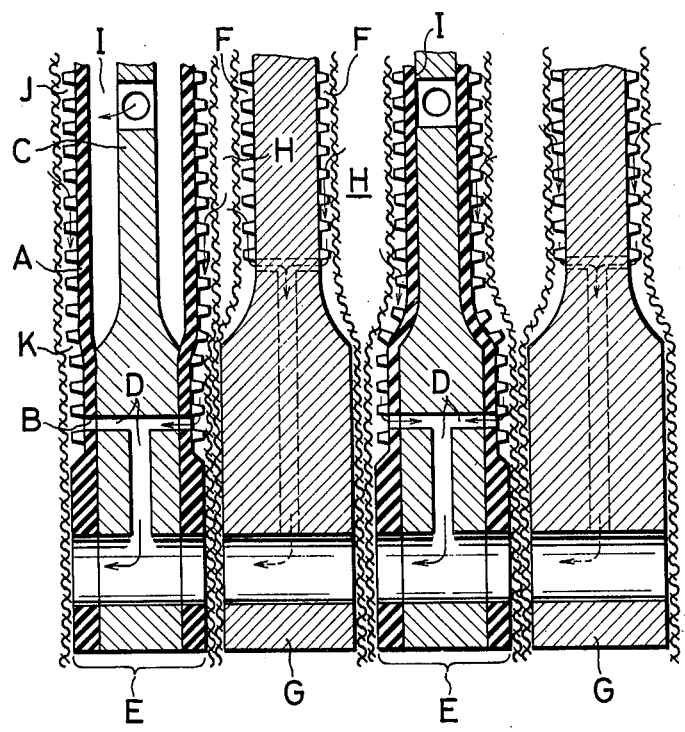
FIG. 1 is a view in section showing conventional expressing filter plates in combination with usual filter plates.
Figure 2:
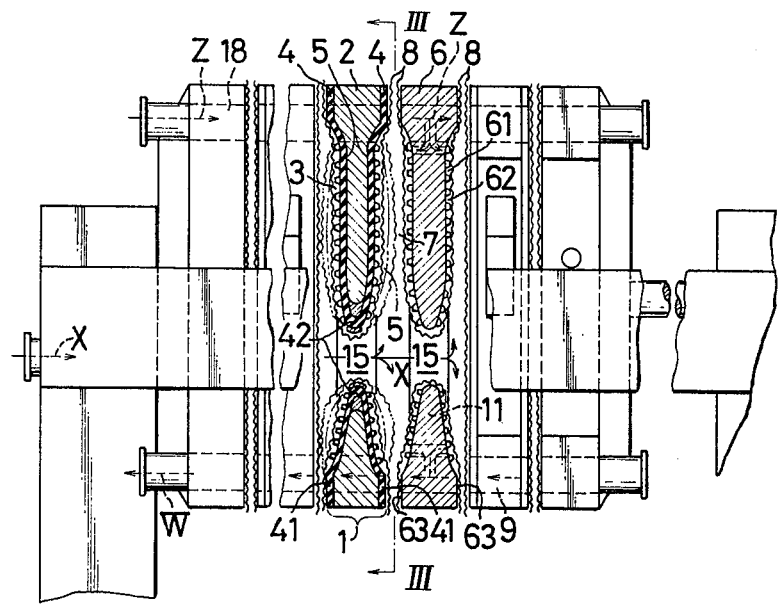
FIG. 2 is a side elevation partly broken away and showing a filter press of the expression type incorporating expressing filter plates of this invention.
Figure 3:
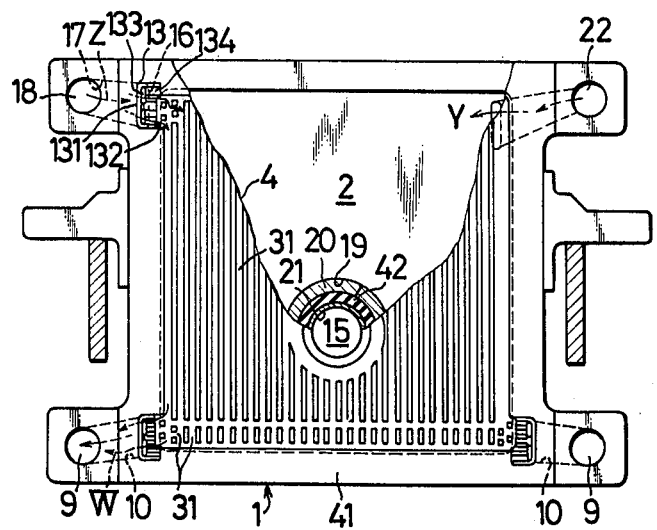
FIG. 3 is a front view taken along the line III—III in FIG. 2 to show the expressing filter plate.

An expressing filter plate 1 comprises a base plate 2 and diaphragm sheets 4 covering the opposite surfaces of the base plate 2 respectively and each having a filter surface 3. Usually the diaphragm sheet 4 is joined to the base plate 2 at its peripheral portion 41 other than the inner portion thereof which defines a pressure fluid chamber 5. As shown in FIG. 2, the expressing filter plates 1 are arranged alternately with usual filter plates 6 each formed with filter surfaces 61 directly on the opposite sides of the plate. The filter surfaces 3 and 61 facing each other define a filter chamber 7. For filtration, a prefilt is forced into each of the filter chambers 7 from a prefilt inlet 15 as indicated by the arrows X in FIG. 2 and is filtered by a filter medium 8 covering the filter surfaces 3 and 61. After the filtration, a pressure fluid is introduced into each pressure fluid chamber 5 from a pressure fluid passage 22 as indicated by the arrow Y in FIG. 3, bulging the diaphragm sheet 4 toward the filter chamber 7 as indicated in the phantom line in FIG. 2 to express the cake accumulating in the filter chamber 7 due to the filtration. The cake resulting from the filtration contains a small amount of liquid, which is almost completely removed therefrom by the expression. A main filtrate discharge passage 9 extending through the base plates 2 and filter plates 6 is branched into filtrate channels 10 and 11 in the base plates and filter plates respectively. The filter channels 10 and 11 are open to the filter surfaces 3 and 61 respectively. The filtrate passing through the filter medium 8 due to the filtration and expression described above flows down filtrate grooves 31 and 62 formed in the filter surfaces 3, 61 and is run off through the channels 10, 11 and the main discharge passage 9 as indicated by the arrows W in FIGS. 2, 3 and 5. The filtrate channel 11 in the usual filter plate 6 is directly open to the filter surface 61, whereas the filtrate channel 10 in the base plate 2 is open to the filter surface 3 via a filtrate outlet 12 formed in the diaphram sheet 4, since the filter surface 3 is formed on the diaphram sheet 4.

According to this invention, a cover member 13 is made of a material having higher hardness than the diaphragm sheet 4 and has a tubular portion 131 fitting in the filtrate outlet 12 of the sheet 4. The diaphragm sheet 4 is molded from vulcanized rubber or the like, while the covering member 13 is molded from a material having higher hardness such as hard rubber, polyethylene, polypropylene or metal. When the diaphragm sheet 4 is subjected to high pressure over the opposite sides thereof during the expression of cake, the sheet 4 tends to undergo deformation in the directions of a plane, but the tubular portion 131 harder than the sheet 4 and provided in the filtrate outlet 12 prevents the resulting inward expansion of the periphery of the filtrate outlet portion 12, rendering the outlet 12 free of any deformation which would constrict or block up the outlet.

At least one of the peripheral portion 41 of the diaphragm sheet 4 having the filtrate outlet 12 and the peripheral portion 63 of the filter plate 6 is projected in the form of a picture frame as illustrated, so that when the expressing filter plate 1 and the filter plate 6 are brought into pressing contact with each other, the peripheral portion 41 will be clamped between the base plate 2 and the filter plate 6. Because of the clamping pressure, the portion of the diaphragm sheet 4 where the outlet 12 is formed is held to the base plate 2 irrespective of whether or not the peripheral portion 41 is joined to the base plate 2, even when the pressure fluid is fed to the fluid chamber 5 to bulge the diaphragm sheet 4. The filtrate outlet 12 is therefore hermetically held in communication with the filtrate channel 10 in the base plate 2. Moreover, because of the above construction which is subjected to the clamping pressure, the covering member 13 can be held in position even when the tubular portion 131 of the covering member 13 is merely fitted in the filtrate outlet 12 elastically.

On the other hand, since the expressing filter plate 1 is held under pressure greater than the expressing pressure against possible separation from the adjoining plate under the action of the expressing pressure, the clamped portion undergoes marked deformation, which would constrict or block the filter grooves to be so formed in the filter surface as to extend to the filtrate outlet portion 12. As experienced with the filtrate outlet of the conventional construction, the outflow of the filtrate through the grooves would then be impeded, giving rise to abnormal high pressure.

To avoid such objection, the covering member 13 includes a flange portion 132 integral with one end of the tubular portion 131, the flange portion 132 being adapted to cover the portion of the diaphragm sheet 4 where an extension of the filter surface is to be provided as referred to above. The flange portion 132 is formed in its surface with fluid grooves 134 for communicating the filtrate outlet 12, namely the opening 133 of the tubular portion 131, with the filtrate grooves 31 provided in the usual area of the filter surface 3. Accordingly by virtue of the hardness of the covering member 13, the fluid grooves 134 in the portion to be clamped will not be readily constricted or blocked by the clamping pressure. The flange portion also prevents the diaphragm sheet 4 from constricting or blocking the filtrate outlet 12 by being forced over the covering member 13 due to deformation.

The covering member 13 may be merely fitted to the diaphram sheet 4 or secured to the base plate 2 with a screw. Alternatively, the end of the tubular portion 131 is so positioned as to oppose the open end of the filtrate channel 10 in the base plate 2, with a bridge 135 formed to partition the opening 133 centrally thereof, the arrangement being such that when the covering members 13 are mounted on the diaphragm sheets 4 on the opposite sides of the base plate 2, the bridges 135 are connected together by a wire 14, utilizing the opening of the filtrate channel 10 extending through the plate 2. In place of the wire 14, a string or an elastic line may be used, with its opposite ends engaged with the bridges to draw them toward each other.

The covering member 13 is thus very easy to mount and yet is effectively retainable in position against dropping. The covering member 13, which is mountable in the above manner, is amenable to the planar displacement of the sheet 4 due to its expansion or contraction, so that the sheet 4 and the covering member 13 are rendered free of an objectionable force and made durable.

Exactly in the same manner as the filtrate outlet 12, the diaphragm sheet 4 is also formed in its peripheral portion 41 with a wash liquor inlet 16 for feeding a back or reverse washing liquor to the filter surface 3 as indicated in the arrows Z in FIGS. 2 an 3. The wash liquor inlet 16, like the filtrate outlet 12, is provided with the same covering member 13 as above (see FIG. 3). The covering member 13 ensures satisfactory reverse washing by preventing the constriction or blocking of the inlet 16 and of the filtrate grooves to be so formed as to extend to the inlet portion, whereby the wash liquor feeding system is protected against damage which would result when the pressure builds up to an abnormal high level. Indicated at 17 is a wash liquor channel in the base plate 2 which channel is in communication with the inlet 16 and branched from a main wash liquor feed passage 18.

As shown in the drawings, the filtrate passage 9 is formed in the lower end of the base plate 2 to completely drain the filtrate. Only one filtrate passage 9 may be provided, but in the illustrated embodiment, the passage 9 is provided on each of the opposite sides of the plate to promote smooth and complete outflow of the filtrate. The wash liquor passage 18 is formed in the upper end of the base plate 2. The wash liquor admitted into the press can be readily run off through the filtrate passage 9 or prefilt inlet 15 which is used temporarily as a drain channel.

The filtrate passage may be provided at the upper end of the base plate, with the wash liquor passage formed at the lower end of the base plate. If the cake has a settling property and tends to accumulate on the bottom of the filter chamber, the cake can then be expressed efficiently and sufficiently while permitting the liquid component to flow away upward. Further since the wash liquor will then fill the interior progressively upward to run off from the upper portion, especially marked clogging at the lower portion of filter medium can be eliminated effectively.

The diaphragm sheets 4 covering the opposite surfaces of the base plate 2 are joined together at the prefilt inlet portion 15. To cover the base plate with the sheets 4, one of the sheets is folded and then passed through the opening 19 in the base plate 2. The joint portion of the sheets to be positioned at the prefilt inlet is therefore simple in structure and ensures satisfactory air-tightness. The opening 19 is made larger than the joint portion 42 of the sheets 4 to render the sheet easy to pass through the opening. The resulting clearance is filled up with a split ring 20 interposed between the joint portion 42 and the inner surface defining the opening 19 to eliminate the displacement of the sheets 4. A metal protective ring 21, fitted in the joint portion 42, restricts bulging of the sheet joint portion 42 during expressing operation to preclude rupture of the sheet.

What is claimed is:

1. An expressing filter plate for a filter press of the expression type comprising:
a base plate,
a diaphragm sheet having a filter surface formed with filtrate grooves and covering the base plate with a pressure fluid chamber provided between the base plate and the diaphragm sheet for receiving a pressure fluid admitted through the base plate, the diaphragm sheet being formed in its peripheral portion to be clamped between pressed filter plates, with at least one fluid passing opening in communication with a fluid passage in the base plate, and
a covering member made of a material having higher hardness than the diaphragm sheet and including a tubular portion fitting in the fluid passing opening and a flange portion formed with fluid grooves for maintaining the tubular portion in communication with the filtrate grooves of the diaphragm sheet.

2. An expressing filter plate as defined in claim 1 wherein the fluid passing opening is a filtrate outlet in communication with a filtrate passage formed in the base plate to discharge a filtrate from the filter surface into the filtrate passage.

3. An expressing filter plate as defined in claim 1 wherein at least two fluid passing openings are formed, the openings including a filtrate outlet in communication with a filtrate passage formed in the base plate to discharge a filtrate from the filter surface into the filtrate passage and a wash liquor inlet in communication with a wash liquor passage formed in the base plate to feed a wash liquor from the wash liquor passage to the filter surface.

4. An expressing filter plate as defined in claim 3 wherein the filtrate passage is provided in each of the opposite side portions of the lower end of the base plate, and the wash liquor passage is provided in one of the opposite side portions of the upper end of the base plate.

5. An expressing filter plate as defined in claim 3 wherein the filtrate passage is provided in one of the opposite side portions of the upper end of the base plate, and the wash liquor passage is provided in one of the opposite side portions of the lower end of the base plate.

6. An expressing filter plate as defined in claim 3 wherein the filtrate passage is provided in each of the opposite side portions of the upper end of the base plate, and the wash liquor passage is provided in one of the opposite side portions of the lower end of the base plate.

7. An expressing filter plate as defined in claim 1 wherein there are front and rear diaphragm sheets covering each of the opposite surfaces of the base plate, the tubular portion of each covering member fitting in the fluid passing opening of the sheet and being formed with a center bridge partitioning the opening of the tubular portion, the bridges of the covering members being positioned in opposed relation to each other on the front and rear diaphragm sheets and connected together utilizing the openings of the fluid passage opened in the opposite surfaces of the base plate.

8. An expressing filter plate as defined in claim 4 wherein there are front and rear diaphragm sheets covering each of the opposite surfaces of the base plate, the diaphragm sheets being joined together in a tubular shape at a center opening of the base plate to form a prefilt inlet, the bridges of the covering members being connected together by a slender fastening member.

* * * * *